(12) United States Patent
Evans, V et al.

(10) Patent No.: US 9,838,521 B2
(45) Date of Patent: Dec. 5, 2017

(54) MULTI-PURPOSE TRAY IN A MOBILE DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/206,172

(22) Filed: Jul. 8, 2016

(65) Prior Publication Data

US 2017/0126870 A1  May 4, 2017

Related U.S. Application Data

(63) Continuation of application No. 15/200,479, filed on Jul. 1, 2016, now abandoned.

(Continued)

(51) Int. Cl.
*H04M 1/21* (2006.01)
*H04M 1/02* (2006.01)

(52) U.S. Cl.
CPC .......... *H04M 1/21* (2013.01); *H04M 1/0249* (2013.01); *H04M 1/0274* (2013.01); *H04M 2250/14* (2013.01)

(58) Field of Classification Search
CPC ..... G06K 7/0013; G06F 1/181; G06F 1/1656; G06F 1/00; H04W 1/21; H04B 1/3816;
(Continued)

(56) References Cited

U.S. PATENT DOCUMENTS 5,915,016 A    6/1999  Savalle et al.
6,035,216 A    3/2000  Cheng et al.
(Continued)

FOREIGN PATENT DOCUMENTS

EP    1083518 B1  *  6/2006

OTHER PUBLICATIONS

Newmodeus, 2nd Hard Drive built-in usb, 2009 http:/twww.newmodeus.com/shoplindex.php?main_page=product_info&products id=234.*
(Continued)

*Primary Examiner* — Ping Hsieh
*Assistant Examiner* — James Yang
(74) *Attorney, Agent, or Firm* — Perkins Coie LLP (57) ABSTRACT

A mobile device can include a support frame adapted to support one or more electronic components of the mobile device. The mobile device includes a chassis shell adapted to form an exterior of the mobile device. The mobile device can include a tray exposed on the exterior and having at least two functional components of the mobile device attached thereon serving at least two different functions (e.g., an electronic function, an input or output function, and/or a mechanical function to support a permanent or temporary component). The chassis shell exposes one of the functional components on the exterior. The tray is capable of sliding outward to further expose the other one of the functional components.

23 Claims, 8 Drawing Sheets

Related U.S. Application Data (60) Provisional application No. 62/249,130, filed on Oct. 30, 2015, provisional application No. 62/317,882, filed on Apr. 4, 2016.

(58) Field of Classification Search
CPC ....... H04B 1/38; H04B 1/3818; H04M 1/035; H04M 1/0274; H05K 5/0295
See application file for complete search history.

(56) References Cited

U.S. PATENT DOCUMENTS

| | | |
|---|---|---|
| 2008/0165508 A1 | 7/2008 | Wang et al. |
| 2009/0185045 A1 | 7/2009 | Rosenblatt et al. |
| 2009/0267677 A1* | 10/2009 | Myers .................... G06K 13/08 327/356 |
| 2012/0162925 A1 | 6/2012 | Luo et al. |
| 2013/0344720 A1* | 12/2013 | Chen ...................... G06F 1/1656 439/131 |
| 2014/0078660 A1* | 3/2014 | Dondzik .............. H04B 1/3888 361/679.31 |
| 2016/0093961 A1* | 3/2016 | Stephens ................. H04B 1/38 439/64 |
| 2016/0202224 A1 | 7/2016 | Lloyd |
| 2016/0285496 A1 | 9/2016 | Larsson et al. |
| 2016/0360632 A1 | 12/2016 | Lee et al. |
| 2017/0126858 A1 | 5/2017 | Evans, V et al. |
| 2017/0126861 A1 | 5/2017 | Evans, V et al. |
| 2017/0126862 A1 | 5/2017 | Evans, V et al. |

OTHER PUBLICATIONS

Epec, Flat ribbon cable, 2014 https://web.archive.org/web/20141201115140/http://www.epectec.com/cable-assemblies/flat-ribbon-cables.html.*

How Not to Design a Dual-SIM Device, Andrew, May 2015 http://openattitude.com/2015/05/20/t'0N-not-to-design-a-dual-sim-device/.*

Evans V, et al., "Conjoining Functional Components of a Mobile Device", Non-Final Action dated Dec. 27, 2016 U.S. Appl. No. 15/200,778 of Evans V et al., 5 pages.

Evans V, et al., "Conjoining Functional Components of a Mobile Device", Non-Final Office Action dated Dec. 27, 2016 in U.S. Appl. No. 15/206,162 of Evans V. et al. filed Jul. 8, 2016, 5 pages.

Evans V , et al., International Search Report and Written Opinion dated Mar. 13, 2017 for PCT application No. PCT/US16/58541, 11 pages.

Evans V , et al., "Multi-Purpose Tray in a Mobile Device", Non-Final Office Action dated Sep. 22, 2016 in U.S. Appl. No. 15/200,479, filed Jul. 1, 2016, 16 pages.

International Search Report and Written Opinion PCT/US16/58946 dated Mar. 23, 2017, 13 pages.

Non-Final Office Action dated May 15, 2017 in U.S. Appl. No. 15/206,162 of Evans et al. filed Jul. 8, 2016; 12 pages.

Non-Final Office Action dated May 18, 2017 in U.S. Appl. No. 15/200,778 of Evans et al. filed Jul. 1, 2016, 13 pages.

* cited by examiner

MULTI-PURPOSE TRAY IN A MOBILE DEVICE

CROSS-REFERENCE TO RELATED APPLICATION(S)

This application is a continuation of U.S. patent application Ser. No. 15/200,479, entitled "MULTI-PURPOSE TRAY IN A MOBILE DEVICE", filed Jul. 1, 2016, which claims the benefits of U.S. Provisional Patent Application No. 62/249,130, entitled "MOBILE DEVICES AND MOBILE DEVICE ACCESSORIES," filed on Oct. 30, 2015, and U.S. Provisional Patent Application No. 62/317,882, entitled "CONJOINING FUNCTIONAL COMPONENTS OF A MOBILE DEVICE," filed on Apr. 4, 2016, which are incorporated by reference herein in their entirety.

BACKGROUND

A conventional mobile device has various "interfacing components" (e.g., connection ports, interactive components, sensor components, audio/video (AV) components, wireless communication components, component covers, or any combination thereof). These interfacing components are exposed on the exterior of the mobile device. An interfacing component, for example, can provide input and/or output (I/O) between an electronic component of the mobile device and an external system, device, and/or user. For example, a mobile device may have a volume button, a power button, a user interface control button, a speaker switch (e.g., for muting and unmuting), an audio port, a memory card port, a microphone hole, a power port, a speaker grill, a subscriber identification module (SIM) card, or any combination thereof. As the number of these interfacing components increases, the mechanical reliability of the mobile device can decrease. The high number of the interfacing components can also increase manufacturing complexity, decrease operator usability, and/or increase device weight and size.

SUMMARY

A mobile device can have one or more interfacing components. Each of the interfacing components can serve a different function. The interfacing components are components that have to be exposed on the exterior of the mobile device for its operation. Some of the external interfacing components, such as an external card slot, may be accessed infrequently. In various embodiments, an external card slot of a mobile device may be integrated with one other interfacing component (referred to as the "conjoint interfacing component").

The mobile device can include electronic circuitry. A chassis can be adapted to protect the electronic circuitry. The chassis can hold and at least partially expose the conjoint interfacing component in an opening of a chassis shell. An external card slot can be attached to and made accessible through the conjoint interfacing component when the conjoint interfacing component is not being used.

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1:
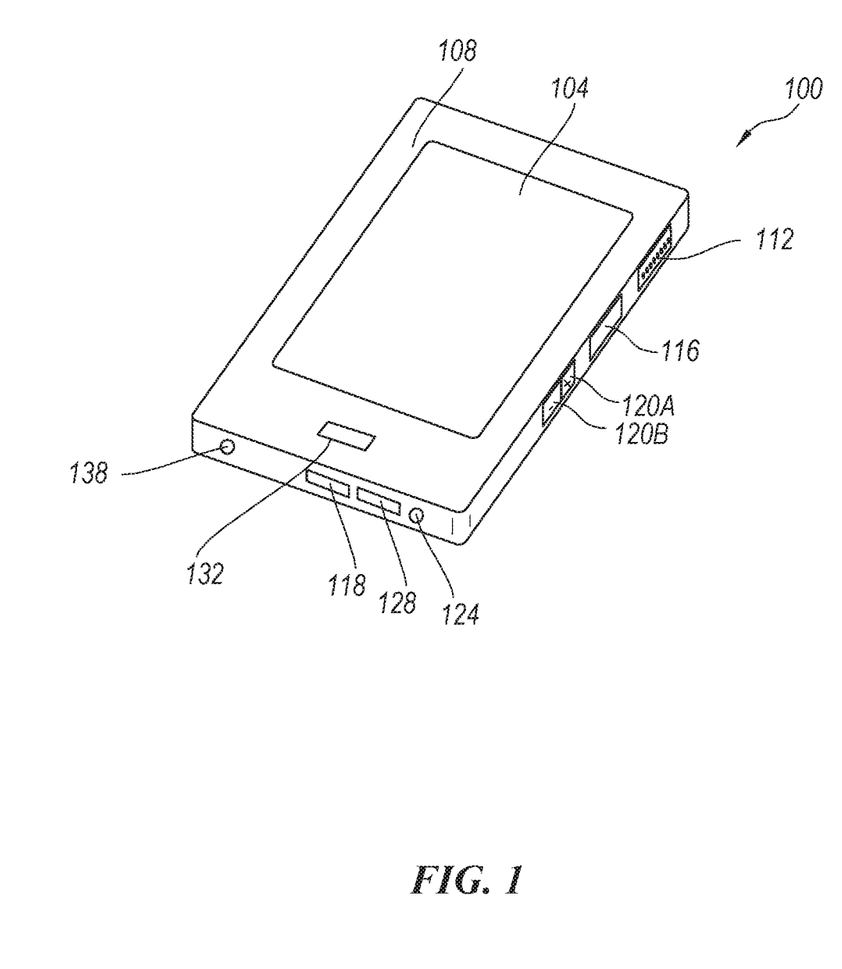
FIG. 1 is a perspective view illustration of a mobile device, in accordance with various embodiments.

Turning now to the figures, FIG. 1 is a perspective view illustration of a mobile device 100, in accordance with various embodiments. The mobile device 100 includes a display 104 and a chassis shell 108. The chassis shell 108 exposes a plurality of interfacing components, such as a speaker grill 112, a power button 116, a power port 118, volume adjustment buttons 120 (e.g., a volume increase button 120A and a volume increase button 120B), a microphone hole 124, a communication port 128, a menu button 132, and an audio jack 138.

In various embodiments, an external card slot for a digital card is attached to at least one of the interfacing components exposed by the chassis shell 108. In these embodiments, the external card slot is accessible through the at least one interfacing component. The external card slot can be a structural frame for holding the digital card. For example, the external card slot can be integrated behind or within the interfacing component.

The external card slot can accept one or more digital cards, such as a flash memory card or a subscriber identification module (SIM) card. The digital cards can be read-only memory or writable digital memory. The digital cards can be external modules for the mobile device 100 to provide data storage, process logic, and/or supplemental functionality. In some embodiments, the digital cards include integrated circuit (IC) chips.

In several embodiments, the external card slot can be attached to one of the interfacing components in a conjoint tray. In one example, the conjoint tray can be adapted to be completely pulled out and detached from the mobile device 100. In another example, the conjoint tray can be adapted to be sufficiently pulled out to expose the external card slot.

In several embodiments, the external card slot can be embedded within one of the connection ports (e.g., the power port 118, the communication port 128, or the audio jack 138). In these embodiments, the external card slot for the digital card is adapted with a size smaller or equal to the size of the opening of the attached port. The attached port can be configured such that a cable/wire connector for the port can still be inserted into the port even when the digital card is inserted into the external card slot.

The following figures provide examples of how the external card slot can be integrated with and/or attached to one or more of the interfacing components exposed on the exterior of the chassis shell 108.

Figure 2A:
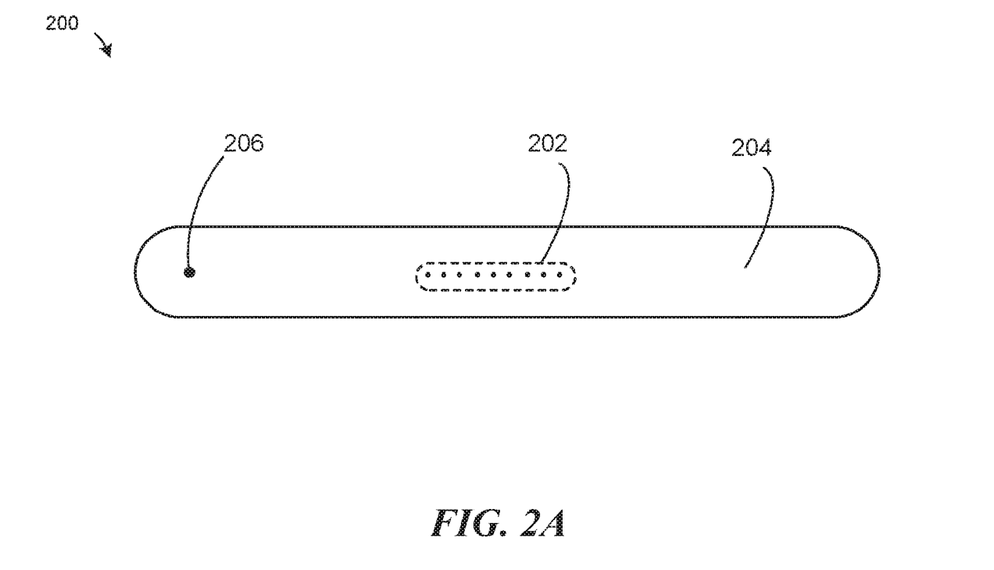
FIG. 2A is a side view illustration of a mobile device having a speaker grill on its side, in accordance with various embodiments.

FIG. 2A is a side view illustration of a mobile device 200 having a speaker grill 202 on its side, in accordance with various embodiments. For example, the mobile device 200 can be the mobile device 100. A chassis shell 204 of the mobile device 200 exposes the speaker grill 202. The mobile device 200 can also have a microphone hole 206 exposed on its side. The chassis shell 204 also exposes the microphone hole 206.

Figure 2B:
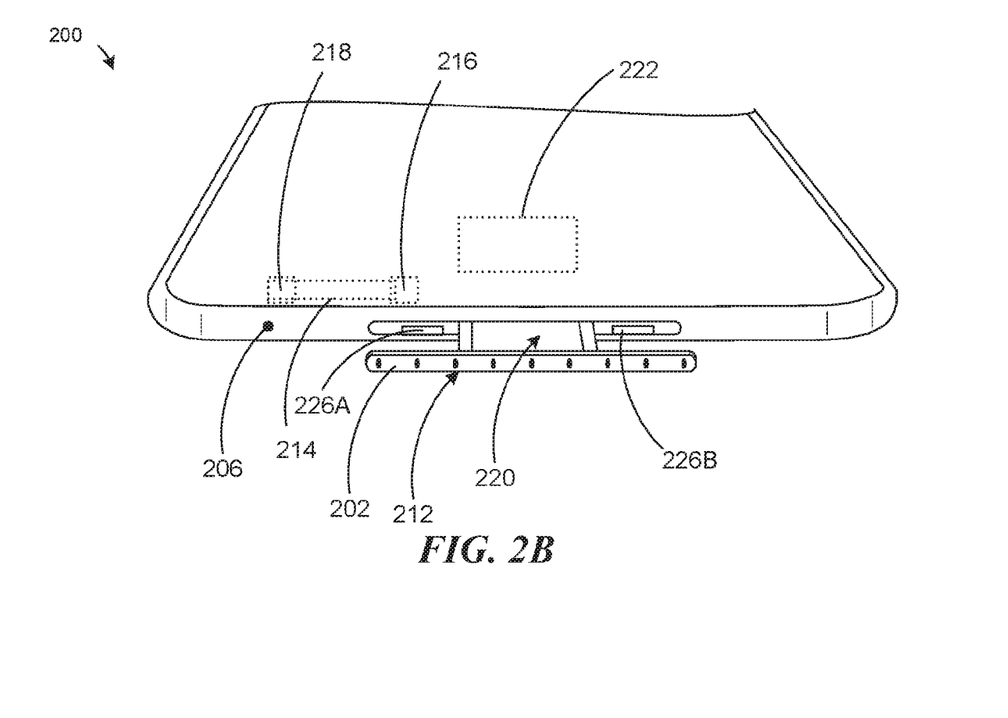
FIG. 2B is a perspective view illustration of the mobile device of FIG. 2A after the speaker grill is pulled out, in accordance with various embodiments.

FIG. 2B is a perspective view illustration of the mobile device 200 of FIG. 2A after the speaker grill 202 is pulled out, in accordance with various embodiments. In the illustration, the portion of the chassis shell 204 with the speaker grill 202 can be part of a conjoint tray 212. For example, the speaker grill 202 can be a front panel of the conjoint tray 212. The conjoint tray 212 can slide out from the mobile device 200 when it is released by a locking mechanism 214 (shown with dotted lines). For example, the locking mechanism 214 may be accessible through the microphone hole 206. The locking mechanism 214 can include a latch portion 216 and a trigger portion 218. In some embodiments, the latch portion 216 is the trigger portion 218. The trigger portion 218 may be at least partially exposed through the microphone hole 206. The locking mechanism 214 can release the latch portion 216 when the trigger portion is pressed within the microphone hole 206. The latch portion 216 can fixate the conjoint tray 212 to the chassis shell 204 or a support frame of the mobile device 200.

The conjoint tray 212 includes an external card slot 220 to hold a digital card for reading by a card reader 222 (e.g., shown with dotted lines) in the mobile device 200. The card reader 222 is separate from (e.g., not attached to) the conjoint tray 212. The digital card in the external card slot 220 can engage with the card reader 222 when the conjoint tray 212 is slid back into the mobile device 200. The locking mechanism 214 can re-engage the latch portion 216 to fixate the conjoint tray 212 and thus prevent accidental release, after the conjoint tray 212 is slid back into the mobile device 200.

In some embodiments, one or more speaker devices 226 (e.g., speaker device 226A and a speaker device 226B, collectively as the "speaker devices 226") can be attached to the conjoint tray 212 and the speaker devices 226 can slide out along with the external card slot 220. In some embodiments, the speaker devices 226 are not attached to the conjoint tray 212, and remain inside the mobile device 200 when the conjoint tray 212 is slid outside (e.g., after release of the locking mechanism 214).

Figure 3A:
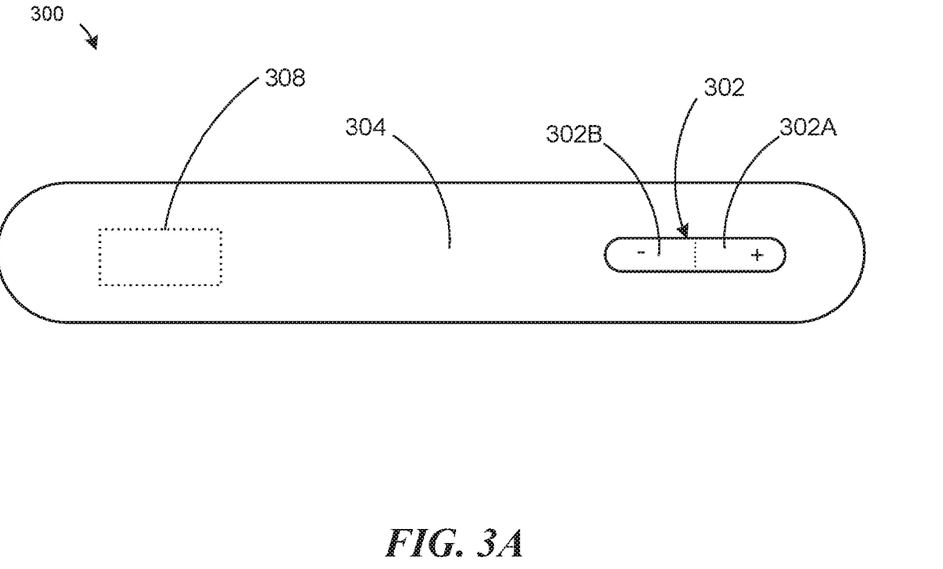
FIG. 3A is a side view illustration of a mobile device having a volume adjustment panel on its side, in accordance with various embodiments.

FIG. 3A is a side view illustration of a mobile device 300 having a volume adjustment panel 302 on its side, in accordance with various embodiments. For example, the mobile device 300 can be the mobile device 100 and/or the mobile device 200. A chassis shell 304 of the mobile device 300 can expose the volume adjustment panel 302. The volume adjustment panel 302 can include volume adjustment buttons (e.g., a volume increase button 302A and a volume decrease button 302B, collectively the volume adjustment panel 302). Electronic circuitry 308 (shown in dotted lines) within the mobile device 300 can detect trigger events associated with interactions of any of the volume adjustment buttons. A trigger event can be a contact event or depression event responsive to the pressing of at least one of the volume adjustment buttons. For example, the electronic circuitry 308 can include a processor, a controller, or a transistor.

Figure 3B:
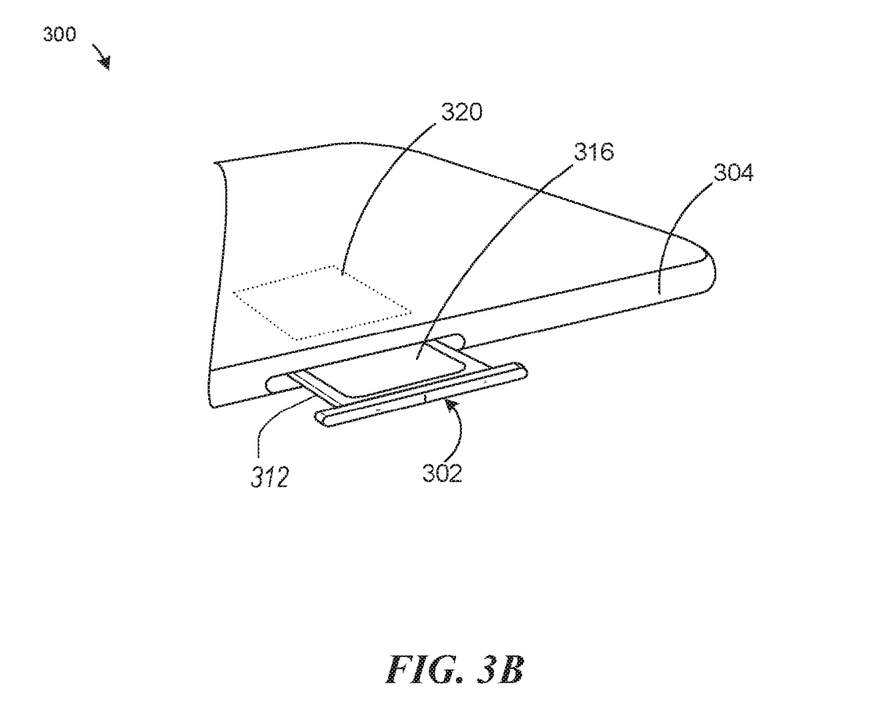
FIG. 3B is a perspective view illustration of the mobile device of FIG. 3B after the volume adjustment panel is pulled out, in accordance with various embodiments.

FIG. 3B is a perspective view illustration of the mobile device 300 of FIG. 3B after the volume adjustment panel 302 is pulled out, in accordance with various embodiments. In the illustration, the portion of the chassis shell 304 with the volume adjustment panel 302 can be part of a conjoint tray 312. For example, the volume adjustment panel 302 can be a front panel of the conjoint tray 312. The conjoint tray 312 can slide out from the mobile device 300 when the electronic circuitry 308 triggers the release of the conjoint tray 312. In one example, the electronic circuitry 308 can detect a pattern of trigger events on the volume adjustment panel 302. In response to detecting the pattern, the electronic circuitry 308 can send a command to an electrically controlled latch (not shown) to release the conjoint tray 312. In other examples, the electronic circuitry 308 can cause the release of the electrically controlled latch in response to a pattern of trigger events on a touch screen of the mobile device 200, on a contact sensor of the conjoint tray 312, etc. In some embodiments, the conjoint tray 312 can be released from a mechanically controlled latch that is mechanically coupled to the conjoint tray 312 and/or the volume adjustment panel 302.

The conjoint tray 312 includes an external card slot 316 to hold a digital card for reading by a card reader 320 (e.g., shown with dotted lines) in the mobile device 300. The card reader 320 is separate from (e.g., not attached to) the conjoint tray 312. The digital card in the external card slot 316 can engage with the card reader 320 when the conjoint tray 312 is slid back into the mobile device 300. The electrically controlled latch can automatically re-engage to fixate the conjoint tray 312 and thus prevent accidental release, after the conjoint tray 312 is slid back into the mobile device 300.

Figure 4A:
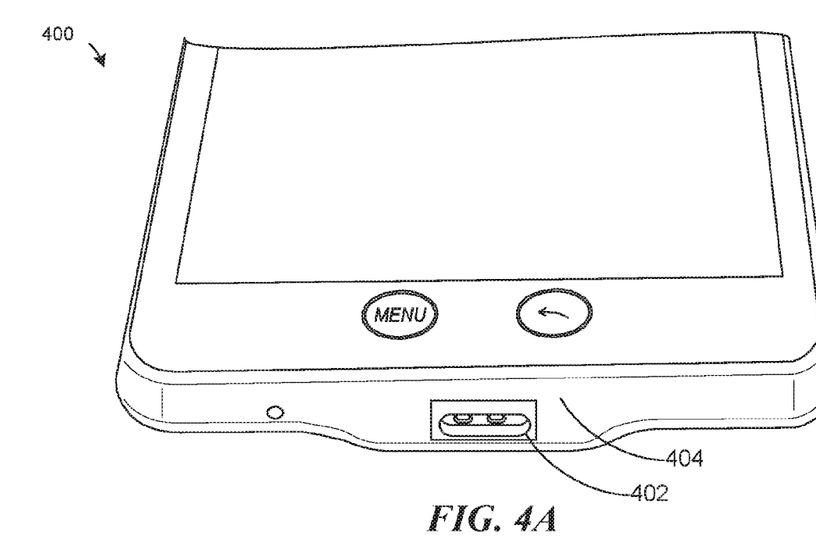
FIG. 4A is a perspective view illustration of a mobile device having a connection port on its side, in accordance with various embodiments.

FIG. 4A is a perspective view illustration of a mobile device 400 having a connection port 402 (e.g., for communication and/or for power) on its side, in accordance with various embodiments. For example, the mobile device 400 can be the mobile device 100, the mobile device 200, and/or the mobile device 300. The connection port 402 can include a cavity to receive a connector of a cable (e.g., a power cable, a communication cable, or a combination thereof). The connector can be a male connector, a female connector, an androgynous connector, or a combination thereof. For example, the connector can be various types of universal serial bus (USB) connectors. A chassis shell 404 of the mobile device 400 exposes the connection port 402.

Figure 4B:
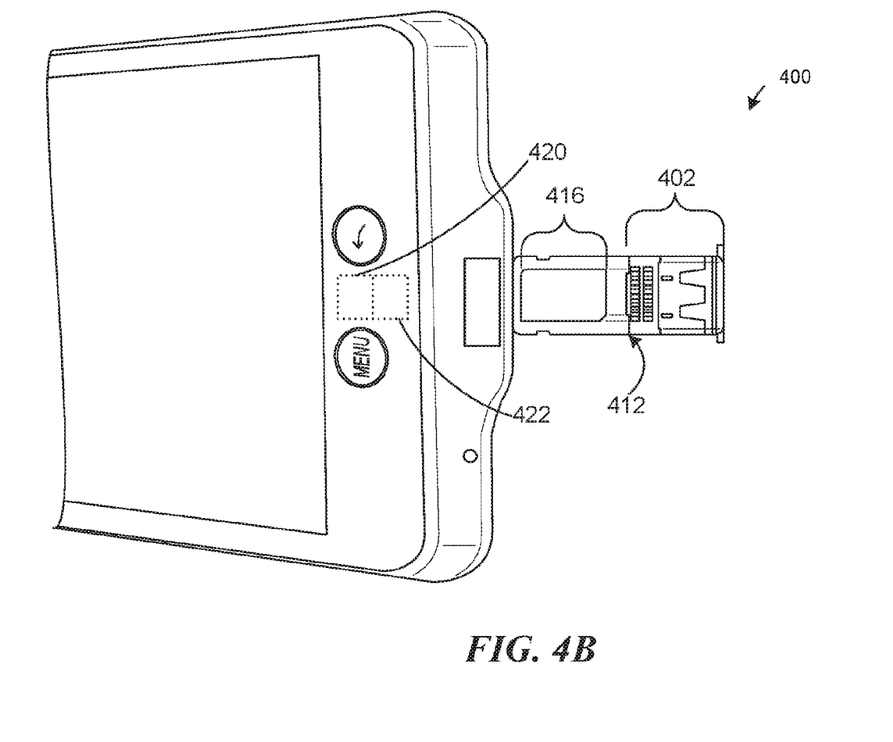
FIG. 4B is a perspective view illustration of the mobile device of FIG. 4A after the connection port is pulled out, in accordance with various embodiments.

FIG. 4B is a perspective view illustration of the mobile device 400 of FIG. 4A after the connection port 402 is pulled out, in accordance with various embodiments. In the illustration, the portion of the chassis shell 404 with the connection port 402 can be part of a conjoint tray 412. The conjoint tray 412 can slide out from the mobile device 400 when it is released by a locking mechanism (not shown). For example, the locking mechanism can be the locking mechanism 214 of FIG. 2.

The conjoint tray 412 includes an external card slot 416 to hold a digital card for reading by a card reader 420 (e.g., shown with dotted lines) in the mobile device 400. The card reader 420 can be separate (e.g., not attached) from the conjoint tray 412. The digital card in the external card slot 416 can engage with the card reader 420 when the conjoint tray 412 is slid back into the mobile device 400. The locking mechanism can re-engage its latch onto the conjoint tray 412 to prevent accidental release after the conjoint tray 412 is slid back into the mobile device 400.

The conjoint tray 412 also includes the connection port 402. The mobile device 400 can include a connection adapter 422 (shown with dotted lines) for processing communication or power signal received at the connection port 402. In some embodiments, the connection adapter 422 can prepare electrical signals or transmission out through the connection port 402.

Figure 5:
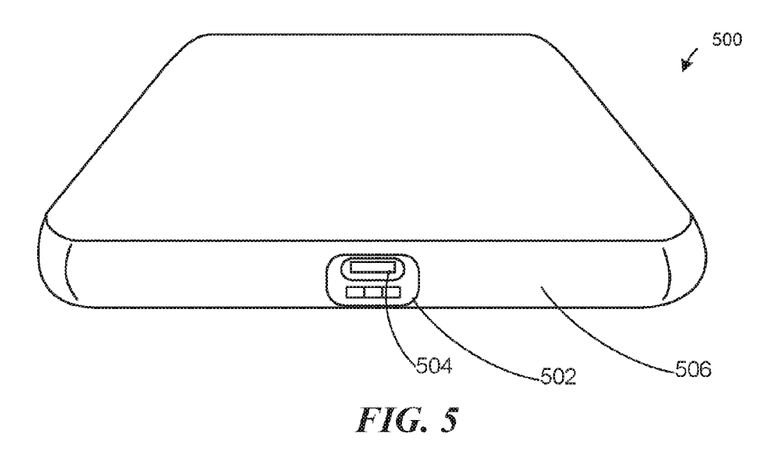
FIG. 5 is a perspective view illustration of a mobile device having a connection port that exposes an external card slot, in accordance with various embodiments.

FIG. 5 is a perspective view illustration of a mobile device 500 having a connection port 502 that exposes an external card slot 504, in accordance with various embodiments. For example, the mobile device 500 can be the mobile device 100, the mobile device 200, the mobile device 300, and/or the mobile device 400. The connection port 502 can include a cavity to receive a connector (e.g., a male connector, a female connector, an androgynous connector, or a combination thereof) of a cable (e.g., a power cable, a communication cable, or a combination thereof).

A chassis shell 506 of the mobile device 500 exposes the connection port 502. The external card slot 504 can be embedded within the cavity of the connection port 502 without interfering with the functionality of the connection port 502. For example, with or without an external card inserted into the external card slot 504, the connector of a cable can still be coupled to (e.g., inserted into) the connection port 502. A card reader (not shown) of the mobile device 500 can read from the external card even if the connector of a cable is coupled to (e.g., inserted into) the connection port 502. However, the external card slot 504 is inaccessible when the connector of a cable is coupled to (e.g., inserted into) the connection port 502, and hence an inserted external card cannot be removed during that time and a new external card cannot be inserted during that time.

Figure 6:
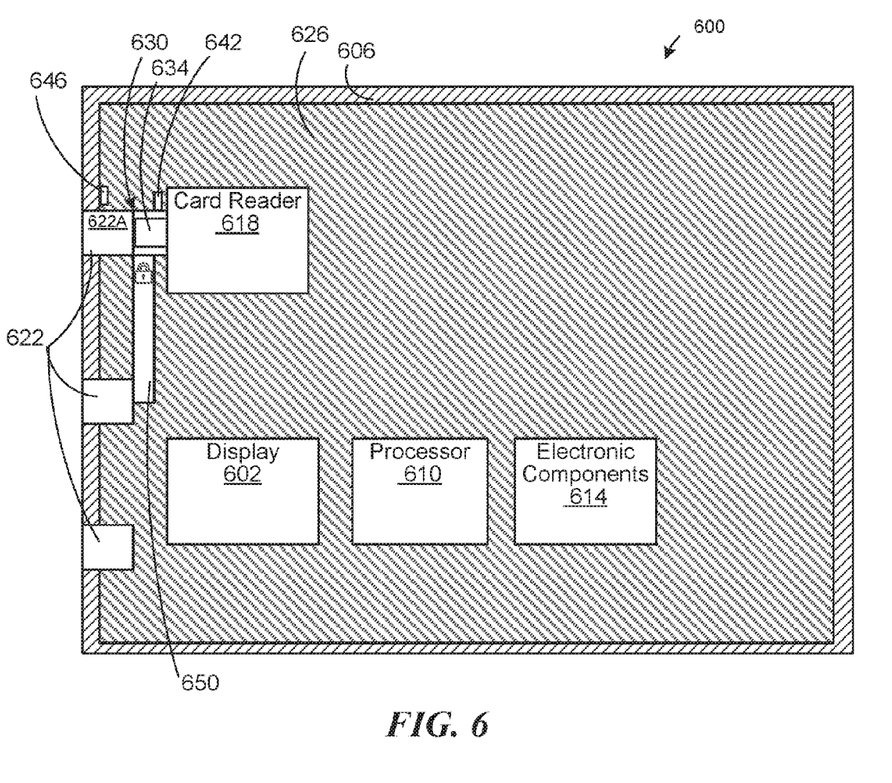
FIG. 6 is a block diagram of a mobile device, in accordance with various embodiments.

FIG. 6 is a block diagram of a mobile device 600, in accordance with various embodiments. For example, the mobile device 600 can be the mobile device 100, the mobile device 200, the mobile device 300, the mobile device 400, and/or the mobile device 500. The mobile device 600 can include a display 602, a chassis shell 606, a processor 610, one or more electronic components 614 (e.g., including a card reader 618), one or more interfacing components 622, or any combination thereof.

The chassis shell 606 can be adapted to protect the electronic components 614 and the processor 610. A support frame 626 (e.g., a circuit board) can hold and support the processor 610 and the electronic components 614. In some embodiments, the support frame 626 provides electrical interconnection for the electronic components 614. The display 602 can be attached over the support frame 626. The chassis shell 606 can be adapted to form an exterior of the mobile device 600 and to protect the electronic components 614 therein. The chassis shell 606 can expose at least part of the display 602. In some embodiments, the display 602 is a touchscreen. The chassis shell 606 and the exposed portion of the display 602 can form a substantially sealed exterior of the mobile device 600.

The chassis shell 606 at least partially exposes the interfacing components 622. At least one of the interfacing components 622 can be a conjoint interfacing component 622A. The conjoint interfacing component 622A is attached to an external card slot 634. The external card slot 634 is accessible (e.g., such that a card can be inserted or removed) through the chassis shell 606 when the conjoint interfacing component 622A is not operational. The external card slot 634 is a structure adapted to receive the external card when the conjoint tray 630. The external card slot 634 can be configured to receive a subscriber identification module (SIM) card, a secure digital (SD) card, an xD card, other flash memory card, or any combination thereof.

The conjoint interfacing component 622A can include one or more interactive buttons (e.g., a power button or a volume control button). The conjoint interfacing component 622A can be or include a sensor component (e.g., a microphone or a camera), a media output component (e.g., a speaker or a projector), and/or a wireless communication component (e.g., an infrared reader or emitter, a Bluetooth transmitter, other radiofrequency transmitter, or any combination thereof). In some embodiments, the conjoint interfacing component 622A is or includes a cover for a sensor component, a media output component, and/or a wireless communication component. In some embodiments, the conjoint interfacing component 622A is or includes a wired communication connection port and/or a wired power port.

In some embodiments, the conjoint interfacing component 622A includes an opening or cavity. In these embodiments, the external card slot 634 is disposed in the opening or cavity. FIG. 5 can be an illustrative example of these embodiments.

In some embodiments, the mobile device 600 includes a conjoint tray 630. The conjoint tray 630 can hold the conjoint interfacing component 622A. The conjoint tray 630 can have an interfacing component portion to support the conjoint interfacing component 622A. The conjoint tray 630 can be adapted to extend/shift outward beyond the exterior formed by the chassis shell 606 or to retract inward to be within the exterior. When retracted, the chassis shell 606 is adapted to expose at least partially the interfacing component portion of the conjoint tray 630 at the exterior of the mobile device 600.

The conjoint tray 630 can slide outward when the conjoint tray is disengaged from the chassis and being pulled. The external card slot 634 can carry the external card back when the conjoint tray 630 is retracted inward. The external card slot 634 can be positioned behind the conjoint interfacing component 622A. The external card slot 634 can be accessible when the conjoint tray 630 extends/shifts beyond an outer perimeter formed by the chassis shell 606 with at least a portion of the external card slot 634 exposed outside of the chassis shell 606.

The conjoint tray 630 and/or the chassis shell 606 can have matching anchor structures (e.g., an anchor structure 642 of the conjoint tray 630 and an anchor structure 646 of the support frame 606). The anchor structures 642 and 646 can be adapted to prevent the conjoint tray 630 from detaching from the mobile device 600 after sliding substantially beyond the exterior formed by the chassis shell 606.

In some embodiments, the conjoint tray 630 includes a front panel adapted to form a continuous surface with the exterior of the mobile device 600. The front panel can be part of the conjoint interfacing component 622A. For example, the front panel can include a speaker grill to enable sound to travel out through the chassis shell 606.

The external card slot 634 can be adapted to hold a digital memory card or a logic component (e.g., an integrated circuit chip). For example, the external card slot 634 can be positioned next to the card reader 618. In these embodiments with conjoint tray 630, the external card slot 634 can be positioned next to the card reader 618 when the conjoint tray 630 is fully retracted. In some embodiments, the card reader 618 is configured to engage with a digital card in the external card slot 634 when the conjoint tray 630 is fully retracted into the mobile device 600. The support frame 626 can include a space to support the card reader 618. The space for the card reader 618 can be directly adjacent to the external card slot 634 of the conjoint tray 630. That is, the conjoint tray 630 can contact a digital card in the external card slot 634 when the conjoint tray 630 is fully retracted inward. The card reader 618 can read digital data from a digital card in the external card slot 634. In some embodiments, the card reader 618 can write data to the digital card or configure parameters of the digital card. In some embodiments, the card reader 618 can utilize the digital card as an application-specific logic processor.

In some embodiments, a locking mechanism 650 (e.g., the locking mechanism 214) can enable movement of the conjoint tray 630. The locking mechanism 650 can be accessible through one of the interfacing components (e.g., the same interfacing component that the conjoint tray 630 is attached to or another interfacing component). In one example, the locking mechanism 650 can be embedded within and/or exposed through an opening (e.g., the microphone hole 124 of FIG. 1 or an opening for a connection port). The locking mechanism 650 can be attached to a connection port (e.g., the power port 118, the audio jack 138, the communication port 128, or any combination thereof) or another exposed interfacing component (e.g., a microphone). The locking mechanism 650 can include a mechanical trigger, an electronically-controlled mechanical trigger, a magnetic trigger, an electro-magnetic trigger, or any combination thereof. In some embodiments, the locking mechanism 650 includes a mechanical latch that releases the conjoint tray 630. In one example, when an object is inserted into an opening of the chassis shell 606 and makes contact with the locking mechanism 650, the mechanical latch can release the conjoint tray 630.

In some embodiments, the locking mechanism 650 is electronically-controlled by a logic unit (e.g., the processor 610 or another logic unit among the electronic components 614) that receives its input from the interfacing components 622. In one example, the logic unit can release the conjoint tray 630 when a set of two or more interactive buttons (e.g., the volume adjustment buttons 120) are clicked at the same time. In another example, the logic unit can release the conjoint tray 630 when one or more interactive buttons (e.g., the menu button 132, volume adjustment buttons 120, the power button 116, or any combination thereof) is held down for a preset time period or consecutively clicked within a preset time interval (e.g., a double-click or a triple click).

Each of the components (e.g., the mechanical and/or electronic components) associated with the mobile device 600 may operate individually and independently of other components of the mobile device 600. Some or all of the components may be mechanically attached to or coupled to one another to form a single apparatus. Electronic components can be coupled through one or more communication channels (e.g., wireless or wired channel) to coordinate their operations. Some or all of the components may be combined as one component. A single component may be divided into sub-components, each sub-component performing separate function or functions of the single component. The mobile device 600 described may include additional, fewer, or different components (e.g., mechanical, electrical, functional, logical, and/or decorative components) for various applications.

Figure 7:
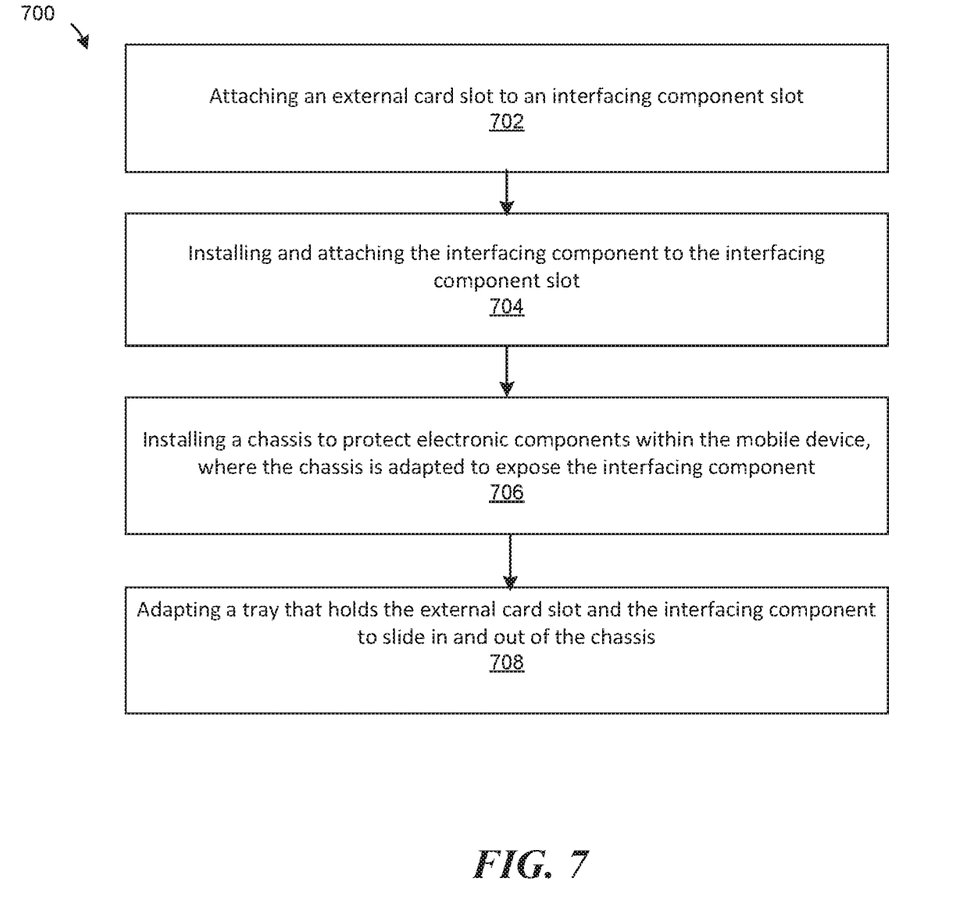
FIG. 7 is a flowchart illustrating a method of manufacturing a mobile device, in accordance with various embodiments.

FIG. 7 is a flowchart illustrating a method 700 of manufacturing a mobile device (e.g., the mobile device 600), in accordance with various embodiments. At step 702, an external card slot can be attached to an interfacing component slot. For example, the external card slot and the interfacing component slot can be glued, soldered, or otherwise attached together from separate parts. Another example, the external card slot can be integrally formed with the interfacing component slot. In some embodiments, the interfacing component slot and the external card slot are both part of a tray structure.

At step 704, the interfacing component can be installed and attached to the interfacing component slot. At step 706, a chassis can be installed to protect electronic components within the mobile device, where the chassis is adapted to expose the interfacing component.

In some embodiments, the interfacing component (e.g., a communication port or a power port) includes an opening or cavity and the external card slot is exposed therein. In these embodiments, the interfacing component is operational when an object (e.g., a connector) is plugged into the opening or cavity, and thus the external card slot becomes inaccessible. However, when no object is plugged into the opening or cavity of the interfacing component, the external card slot becomes accessible.

In other embodiments, the interfacing component slot and the external card slot are attached together in a tray. The external card slot can be positioned behind the interfacing component slot and therefore the interfacing component. At step 708, the tray can be adapted to slide in and out of the mobile device chassis.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 8:
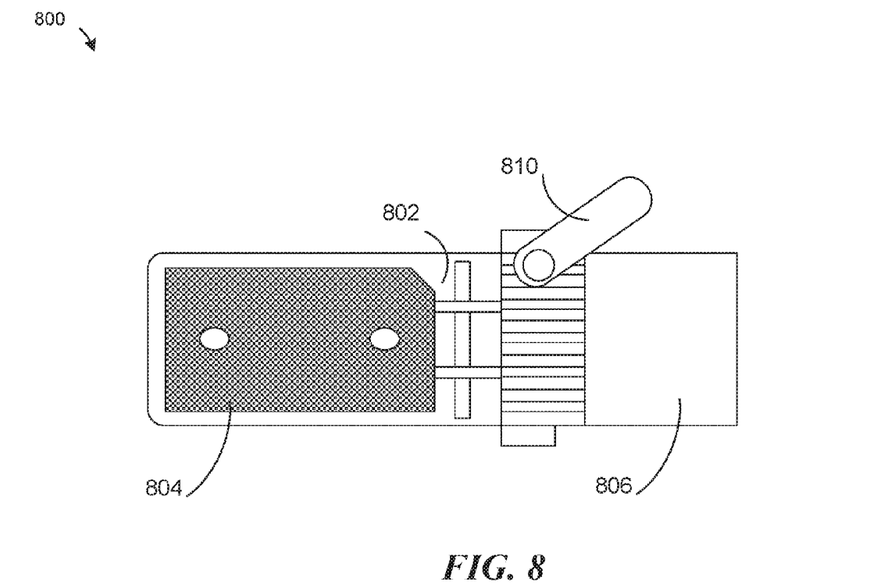
FIG. 8 is a top view illustration of a conjoint tray, in accordance with various embodiments.

FIG. 8 is a top view illustration of a conjoint tray 800, in accordance with various embodiments. Components in the conjoint tray 800 are supported by a tray body 802, which is a rigid support structure. The conjoint tray 800 includes the external card slot 804 and the interfacing component 806. The external card slot 804 can be attached to the interfacing component 806. For example, the interfacing component 806 can be a connection port (e.g., a USB port), a retractable camera, a user interaction button, a cover, a sensor component, a media output component, or any combination thereof. The external card slot 804 is a structural frame for holding an external card (e.g., a SIM card or a digital memory card) adjacent to a card reader (e.g., such that the card reader electrically and physically contacts the external card) of a mobile device when the conjoint tray 800 is fully retracted into the mobile device.

The conjoint tray 800 can also include a locking mechanism 810 (e.g., the locking mechanism 214 and/or the locking mechanism 650). In some embodiments, the locking mechanism 810 can include a tray ejection mechanism that causes the conjoint tray 800 to be ejected when the locking mechanism 810 unlocks. For example, the locking mechanism 810 can include a cam that latches onto a support frame (not shown) of a mobile device. The locking mechanism 810 can include spring-loaded to anchor against the support frame. The locking mechanism 810 can also include spring-loaded cam structure, a push-push release mechanism, fingernail detent release mechanism, or any combination thereof. When an external object (e.g., an external pin) pushes against the locking mechanism 810, the locking mechanism 810 can release the conjoint tray 800 from the support frame, thus enabling the conjoint tray 800 to move away from the mobile device.

Figure 9:
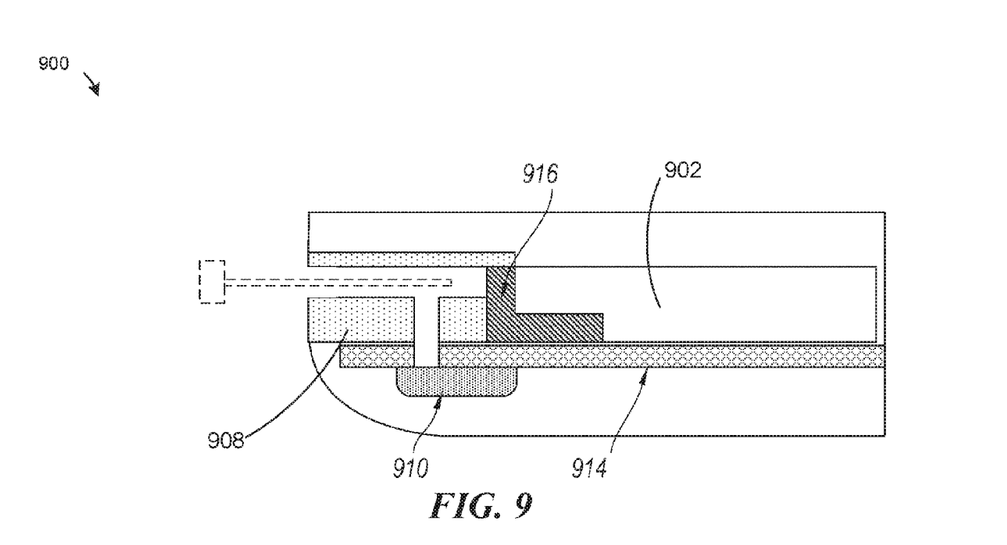
FIG. 9 is cross-sectional view illustration of a mobile device with a conjoint tray, in accordance with various embodiments.

FIG. 9 is cross-sectional view illustration of a mobile device 900 with a conjoint tray 902, in accordance with various embodiments. The mobile device 900 can include a chassis shell 904. The chassis shell 904 can include an opening 906 (e.g., formed by a pipe structure 908) that leads to a microphone 910. For example, the microphone 910 can be electrically coupled to and attached to a circuit board 914 (e.g., a support frame for one or more electronic components) of the mobile device 900.

The conjoint tray 902 can rest over the circuit board 914. A rail 916 can be attached to the circuit board 914 such that the conjoint tray 902 can slide along the rail 916. The conjoint tray 902 can include a locking mechanism (not shown) that mechanically locks the conjoint tray 902 within the mobile device 900. For example, the locking mechanism can be the locking mechanism 214, the locking mechanism 650, and/or the locking mechanism 810.

In some embodiments, the opening 906 includes at least two straight portions. A first straight portion of the opening 906 extends from outside the exterior of the mobile device 900 toward the rail 916. A second straight portion of the opening 906 extends from a point along the first straight portion toward the microphone 910. The first straight portion exposes the locking mechanism of the conjoint tray 902 such that an external object (shown in dashed lines) can press against the locking mechanism to release the conjoint tray 902. The external object can be a pin. The second straight portion enables sound to travel through the opening 906 to the microphone 910. In some embodiments, the microphone 910 is replaced by a speaker, another sensor component, a mechanical/electrical input component (e.g., button or a switch), and/or another media output component (e.g., light source or sound source).

Figure 10:
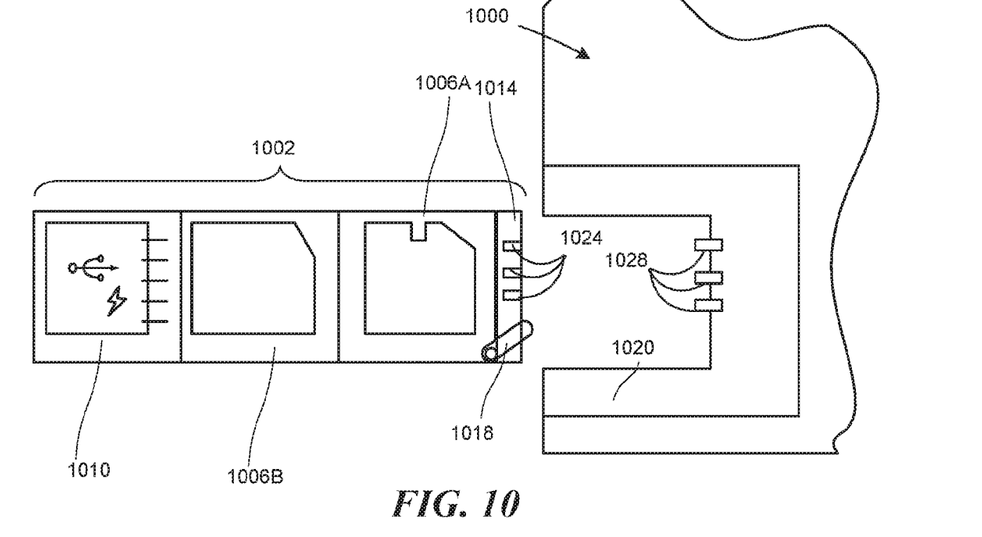
FIG. 10 is a top plan view illustration of a mobile device that accepts a conjoint tray, in accordance with various embodiments.

FIG. 10 is a top plan view illustration of a mobile device 1000 that accepts a conjoint tray 1002, in accordance with various embodiments. The conjoint tray 1002 includes one or more external card slots (e.g., an external card slot 1006A and an external card slot 1006B, collectively as the "external card slots 1006"), an interfacing component 1010, a tray connection interface 1014, and a locking mechanism 1018 (e.g., the locking mechanism 810). The tray connection interface 1014, the external card slots 1006 and the interfacing component 1010 can be positioned in series on the conjoint tray 1002. In some embodiments, the interfacing component 1010 is detachably attached to the conjoint tray 1002. For example, a different interfacing component can be switched into the conjoint tray 1002 by removing the interfacing component 1010 currently attached to the conjoint tray 1002 and inserting another interfacing component in its place.

The mobile device 1000 includes a tray receptacle 1020. The tray receptacle 1020 can be embedded on an outer perimeter of the mobile device 1000. In some embodiments, the tray connection interface 1014 includes one or more contact fingers 1024. When the conjoint tray 1002 is inserted into the tray receptacle 1020, the contact fingers 1024 makes electrical contact with one or more contact pads 1028 within the tray receptacle 1020. In some embodiments, the contact pads 1028 can be embedded on a circuit board (e.g., the circuit board 914). In the illustrated embodiments, the tray connection interface 1014 includes the contact fingers 1024 and the tray receptacle 1020 includes the contact pads 1028; however, in other embodiments, the tray connection interface 1014 includes contact pads and the tray receptacle 1020 includes contact fingers.

In the illustrated embodiments, the interfacing component 1010, the external card slots 1006, and the tray connection interface 1014 are positioned linearly from one another. For example, at least one of the external card slot 1006 can be positioned sequentially behind the interfacing component 1010 and the tray connection interface 1014 can be positioned sequentially behind the at least one of the external card slots 1006. However, in other embodiments, the interfacing component 1010, the external card slots 1006, and the tray connection interface 1014 can be positioned nonlinearly on the conjoint tray 1002. In one example, the interfacing component 1010 (e.g., a wired connection port) and the tray connection interface 1014 can be positioned on parallel edges of the conjoint tray 1002 (as shown). In another example, the interfacing component 1010 and the tray connection interface 1014 can be positioned on perpendicular edges of the external tray (not shown).

Figure 11:
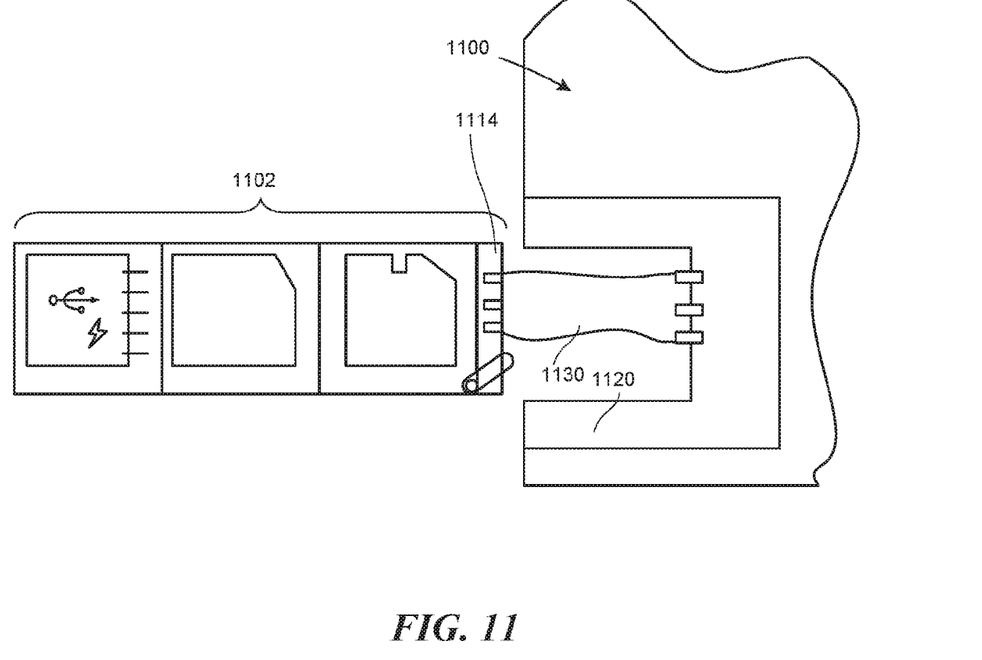
FIG. 11 is a top plan view illustration of a mobile device that is attached to a conjoint tray via a flexible cable, in accordance with various embodiments.

FIG. 11 is a top plan view illustration of a mobile device 1100 that is attached to a conjoint tray 1102 via a flexible cable 1130, in accordance with various embodiments. The mobile device 1100 can be similar to the mobile device 1000 and the conjoint tray 1102 similar to the conjoint tray 1002 except in how a tray connection interface 1114 couples to a tray receptacle 1120. For example, the tray connection interface 1114 is coupled to the tray receptacle 1120 via a flexible cable 1130 (e.g., a ribbon cable) such that movement of the conjoint tray 1102 does not decouple the tray connection interface 1114 from the tray receptacle 1120.

Some embodiments of the disclosure have other aspects, elements, features, and steps in addition to or in place of what is described above. These potential additions and replacements are described throughout the rest of the specification. Reference in this specification to "various embodiments," "several embodiments," "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A mobile device comprising:
   one or more electronic components including a card reader;
   a support frame adapted to support and facilitate electrical interconnection for the electronic components within the mobile device;
   a chassis shell adapted to form an exterior of the mobile device and to enclose the support frame; and
   a tray formed by at least an external card slot and a sound interface port, wherein the external card slot and the sound interface port perform separate functions, wherein the sound interface port comprises a speaker grill, wherein the chassis shell includes an opening that at least partially exposes the sound interface port at the exterior of the mobile device;
   wherein the tray is adapted to shift outward beyond the exterior formed by the chassis shell or retract inward within the exterior, and wherein the external card slot is a structure adapted to receive an external card when the tray is shifted outward and to hold the external card to make electrical contact with the card reader when the tray is retracted inward; and
   wherein the tray includes a detachable tray connection interface for electrically coupling the sound interface port to at least one of the electronic components of the mobile device when the tray is placed inward within the exterior.

2. The mobile device of claim 1, wherein the support frame includes a circuit board; and wherein the detachable tray connection interface is coupled to the circuit board via a flexible cable such that movement of the tray does not decouple the detachable tray connection interface from the circuit board.

3. The mobile device of claim 1, wherein the tray is adapted to be removable from the mobile device.

4. The mobile device of claim 1, further comprising a tray receptacle structure attached to the support frame; and wherein the detachable tray connection interface comprises one or more contact fingers adapted to make electrical contact with the tray receptacle structure when the tray is fully retracted into the mobile device.

5. The mobile device of claim 1, wherein the tray comprises a locking mechanism adapted to latch the tray onto the support frame or the chassis shell.

6. The mobile device of claim 5, wherein the locking mechanism includes a spring-loaded cam structure, a push-push release mechanism, fingernail detent release mechanism, or any combination thereof.

7. The mobile device of claim 5, wherein the chassis shell includes a hole to expose the locking mechanism such that an external object is able to mechanically move the locking mechanism to release the tray.

8. The mobile device of claim 7, further comprising a microphone sensor with at least a voice sensing surface exposed within the hole.

9. The mobile device of claim 1, wherein the support frame includes a circuit board coupled to the card reader; and wherein the card reader is disposed at a fixed position on the circuit board to make contact with the external card placed in the external card slot when the tray is fully retracted into the mobile device.

10. An external tray for insertion into a mobile device, comprising:
    an external card slot adapted to receive an external card;
    a tray support structure that holds the external card slot and a sound interface port, wherein the external card slot and the sound interface port perform separate functions, wherein the sound interface port comprises a speaker grill, wherein the tray support structure is adapted to shift in and out of an exterior of the mobile device;
    a detachable tray connection interface comprised of one or more electrically conductive elements to electrically couple the sound interface port to the mobile device after the external tray is inserted into the mobile device; and
    a latch mechanism attached to the tray support structure to lock the external tray to the mobile device once the external tray is inserted into the mobile device.

11. The external tray of claim 10, wherein the external card slot, the sound interface port, and the tray connection interface are positioned sequentially behind one another.

12. The external tray of claim 10, wherein the sound interface port and the tray connection interface are positioned on parallel edges of the external tray.

13. The external tray of claim 10, wherein the sound interface port and the tray connection interface are positioned on perpendicular edges of the external tray.

14. The external tray of claim 10, wherein the latch mechanism includes a spring-loaded cam, a push-push release mechanism, fingernail detent release mechanism, or any combination thereof.

15. The external tray of claim 10, wherein the external card slot is a first external card slot, and the external tray further comprises a second external card slot positioned between the first external card slot and the sound interface port.

16. The external tray of claim 10, wherein the sound interface port is modularly removable.

17. A mobile device comprising:
    a support frame adapted to support one or more electronic components;
    a chassis shell adapted to form an exterior of the mobile device to protect the electronic components therein; and
    a tray exposed on the exterior and having at least two functional components of the mobile device attached thereon serving at least two different functions, wherein a first functional component comprises a sound interface port, wherein the sound interface port comprises a speaker grill;
    wherein the chassis shell is adapted to expose one of the functional components on the exterior and wherein the tray is capable of sliding outward to further expose the other one of the functional components.

18. The mobile device of claim 17, wherein the at least two functional components includes a card slot to carry an integrated circuit (IC) card.

19. The mobile device of claim 18, further comprising a card reader; wherein the support frame forms a space for the card reader; and wherein the space for the card reader is directly adjacent to the card slot when the tray is fully placed inward.

20. The mobile device of claim 17, wherein the at least two functional components includes a wired or wireless connection port for communication or for power supply.

21. The mobile device of claim 17, further comprising an anchor adapted to prevent the tray from detaching from the mobile device after sliding substantially beyond the exterior formed by the chassis shell.

22. The mobile device of claim 17, wherein the tray is fully removable from the mobile device.

23. The mobile device of claim 17, wherein the support frame forms one or more rails for the tray to slide in and out of a cavity in the support frame.

\* \* \* \* \*